(12) United States Patent
Munireddy et al.

(10) Patent No.: US 9,223,564 B2
(45) Date of Patent: Dec. 29, 2015

(54) UPDATE SYSTEMS RESPONSIVE TO ONGOING PROCESSING AT A STORAGE SYSTEM

(75) Inventors: Madan Mohan Munireddy, Bangalore (IN); Prafull Tiwari, Lucknow (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 799 days.

(21) Appl. No.: 13/359,314

(22) Filed: Jan. 26, 2012

(65) Prior Publication Data

US 2013/0198730 A1    Aug. 1, 2013

(51) Int. Cl.
G06F 9/44    (2006.01)
G06F 9/445    (2006.01)

(52) U.S. Cl.
CPC    *G06F 8/665* (2013.01); *G06F 8/65* (2013.01); *G06F 8/60* (2013.01); *G06F 8/61* (2013.01)

(58) Field of Classification Search
CPC ......... G06F 8/65; G06F 8/71; G06F 11/1433; G06F 8/60; G06F 8/70; G06F 3/1225; G06F 3/123; G06F 8/61
See application file for complete search history.

(56) References Cited

U.S. PATENT DOCUMENTS

| | | | | |
|---|---|---|---|---|
| 6,877,037 | B1 * | 4/2005 | Adachi | 709/227 |
| 7,203,723 | B2 * | 4/2007 | Ogawa | 709/203 |
| 7,904,608 | B2 | 3/2011 | Price | |
| 8,321,858 | B1 * | 11/2012 | Marmaros et al. | 717/173 |
| 8,694,984 | B2 * | 4/2014 | Chang | 717/169 |
| 2005/0188170 | A1 * | 8/2005 | Yamamoto | 711/170 |
| 2006/0015861 | A1 * | 1/2006 | Takata et al. | 717/168 |
| 2008/0005733 | A1 | 1/2008 | Ramachandran et al. | |
| 2009/0187901 | A1 * | 7/2009 | Kanai | 717/173 |
| 2009/0292873 | A1 * | 11/2009 | Aono et al. | 711/114 |
| 2010/0005460 | A1 * | 1/2010 | Aiba et al. | 717/173 |
| 2010/0169876 | A1 | 7/2010 | Mann | |
| 2010/0229166 | A1 * | 9/2010 | Mopur et al. | 717/168 |
| 2011/0093839 | A1 * | 4/2011 | Murase | 717/168 |
| 2012/0054729 | A1 * | 3/2012 | Sobel et al. | 717/169 |
| 2012/0159142 | A1 * | 6/2012 | Jibbe et al. | 713/100 |
| 2013/0111459 | A1 * | 5/2013 | Nakamoto | 717/172 |

OTHER PUBLICATIONS

Hang-Sik Shin; Method of Managing External Devices, Method of Operating External Device, Host Device, Management Server, and External Device; May 21, 2015; Patentdocs; retrieved online on Aug. 17, 2015; pp. 1-21; Retrieved from the Internet: <URL: http://www.faqs.org/patents/app/20150143357>.*

(Continued)

*Primary Examiner* — Tuan Q. Dam
*Assistant Examiner* — Hanh T Bui

(57) ABSTRACT

Methods and systems for updating devices of a storage system are provided. The system comprises a management system and at least one client system. The management system contacts a network-accessible portal providing updates for firmware residing on storage system devices. The client system is coupled for communication with the management system and comprises one or more storage system devices. The management system acquires version information for the storage system devices of the client system, and compares the version information for the storage system devices to version information accessible via the portal to determine whether to download updates from the portal. The client system downloads an update from the management system, determines a volume of activity at a storage system device, and pushes the update to the storage system device if the volume of activity is below a threshold.

20 Claims, 5 Drawing Sheets

(56) References Cited

OTHER PUBLICATIONS

Preetum Nakkiran et al.; Fundamental Limits on Communication for Oblivious Updates in Storage Networks; 2014; IEEE; retrieved online on Aug. 17, 2015; pp. 2363-2368; Retrieved from the Internet: <URL: http://ieeexplore.ieee.org/stamp/stamp.jsp?tp=&arnumber=7037161>.*

* cited by examiner

FIG. 3

CLIENT SYSTEM 302

| COMPONENT/DEVICE | F/W VERSION |
|---|---|
| MR9260-8i | 2.69-02-100 |
| ESM | 4.4 |
| MR9280-8e | 2.120-06-1247 |
| MSM | 3.140-01 |

302-1

CLIENT SYSTEM 304

| COMPONENT/DEVICE | F/W VERSION |
|---|---|
| ESM | 4.8 |
| MR9285-8e | 3.150-05-1341 |
| PERC H700 | 1.12-02-1106 |
| MSM | 3.150-05 |

MANAGEMENT SYSTEM 402

| COMPONENT/DEVICE | CLIENT | F/W VERSION | UPDATE AVAIL | REBOOT |
|---|---|---|---|---|
| MR9260-8i | 302 | 2.69-02-100 | YES | YES |
| ESM | 302 | 4.4 | YES | YES |
| MR9280-8e | 302 | 2.120-06-1247 | NO | YES |
| MSM | 302 | 3.140-01 | YES | NO |
| ESM | 304 | 4.8 | NO | YES |
| MR9285-8e | 304 | 3.150-05-1341 | YES | YES |
| PERC H700 | 304 | 1.12-02-1106 | YES | YES |
| MSM | 304 | 3.150-05 | NO | NO |

402-1

UPDATE SYSTEMS RESPONSIVE TO ONGOING PROCESSING AT A STORAGE SYSTEM

BACKGROUND

1. Field of the Invention

The invention relates generally to storage systems and more specifically relates to updating firmware residing on devices of a storage system.

2. Discussion of Related Art

In order to achieve the goal of storing data reliably and efficiently, storage systems typically include hundreds, if not thousands of interworking devices. For example, storage systems may include storage controllers, host bus adaptors, storage devices (e.g., hard disks, optical media, solid state drives, and other components for storing large volumes of data persistently), and other components. In order to ensure that the storage system functions as effectively as possible, it is generally desirable to ensure that each of these storage system devices utilizes the latest version of firmware possible (i.e., each of these components should utilize the latest version of programmed operational instructions stored in a memory and/or other programmed logic components). For example, using the latest version of firmware can reduce the chances of encountering a bug, can enable enhanced device functionality, or can even add entirely new device features.

Unfortunately, manually updating the numerous components of a storage system is a very time-consuming process. A system engineer may, for example, waste valuable time in determining the model number and/or current firmware version number of each storage system component, in searching to find updates available for each model number, and in checking to see if the discovered updates are more recent than the current version of firmware used by the component. With this in mind, it can be understood that manually "pushing" a firmware update to each device within the storage system is undesirable. At the same time, automatically pushing updates to storage system components may result in system downtime or degraded functionality at times when the storage system is needed most. For example, storage system devices may experience degraded functionality when they are being updated. If this occurs during periods of heavy use within the storage system, then the storage system may provide a noticeably reduced quality-of-service to end users.

Thus it is an ongoing challenge to update the numerous and varied components of a storage system without harming the overall effectiveness and speed of the storage system.

SUMMARY

The present invention solves the above and other problems, thereby advancing the state of the useful arts, by providing methods and systems for automatically acquiring firmware updates for devices of a storage system, and then selectively applying those updates at a time determined based on the volume of queued host I/O requests at each device.

In one aspect hereof, a method is provided for utilizing a management system coupled with a client system to provide firmware updates to storage system devices of the client system. The method comprises contacting, via a management system, a network-accessible portal providing updates for firmware residing on storage system devices. The method also comprises acquiring, via the management system, version information for storage system devices residing on a client system that is coupled with the management system, and comparing the version information for the storage system devices to version information accessible via the portal to determine whether to download updates from the portal. Further, the method includes downloading, via the client system, an update from the management system, and determining a volume of activity at a storage system device. Additionally, the method includes pushing, via the client system, the update to the storage system device if the volume of activity is below a threshold.

Another aspect hereof provides a storage system comprising a management system and at least one client system. The management system is operable to contact a network-accessible portal providing updates for firmware residing on storage system devices. The client system is coupled for communication with the management system and comprises one or more storage system devices. The management system is further operable to acquire version information for the storage system devices of the client system, and to compare the version information for the storage system devices to version information accessible via the portal to determine whether to download updates from the portal. The client system is further operable to download an update from the management system, to determine a volume of activity at a storage system device, and to push the update to the storage system device if the volume of activity is below a threshold.

BRIEF DESCRIPTION OF THE DRAWINGS

FIG. 3 is a block diagram illustrating exemplary mapping structures for storage system devices maintained at client systems in accordance with features and aspects hereof FIG. 4 is a block diagram illustrating an exemplary mapping structure for storage system devices maintained at a management system in accordance with features and aspects hereof

DETAILED DESCRIPTION OF THE DRAWINGS

Figure 1:
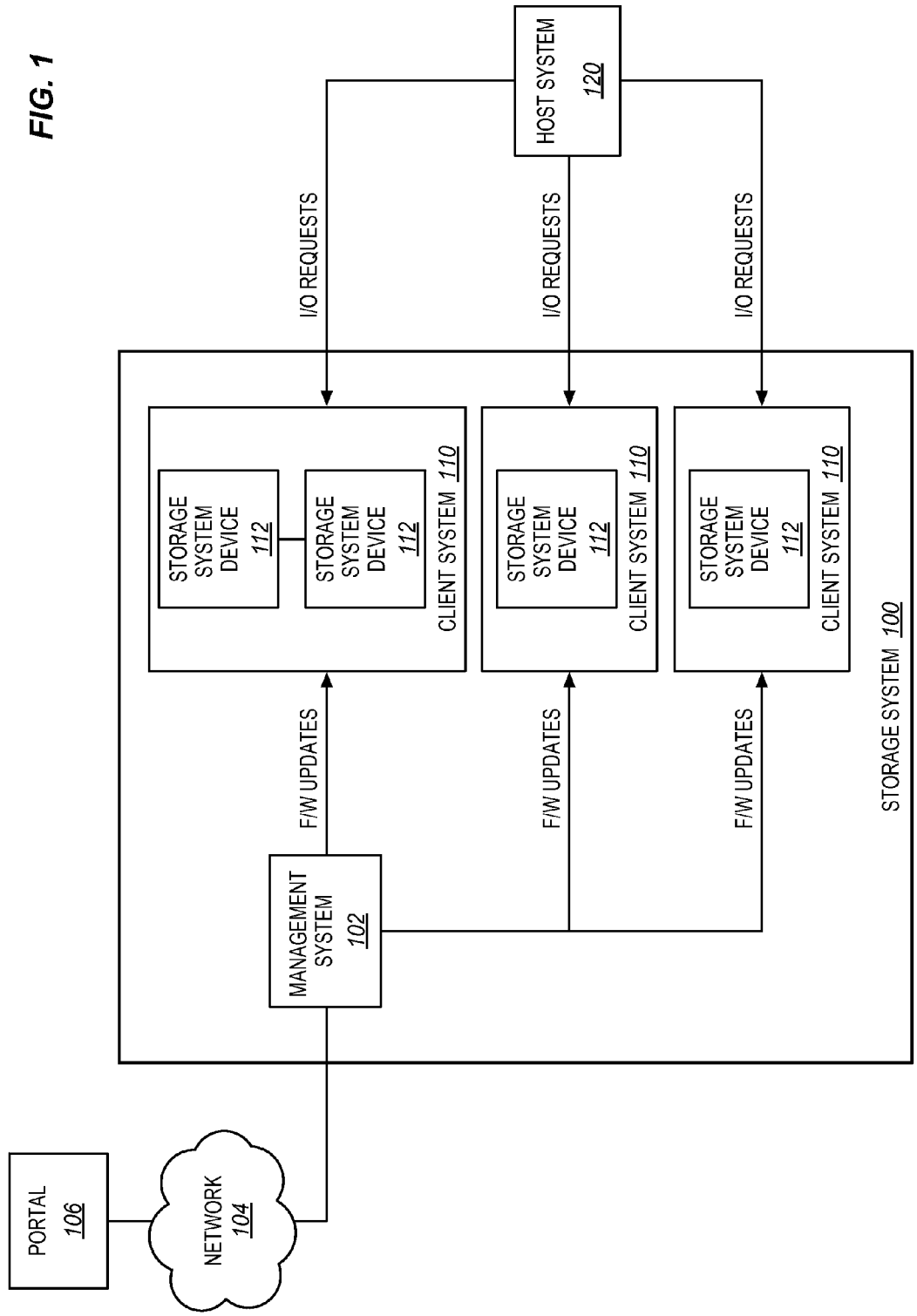
FIG. 1 is a block diagram of an exemplary storage system implementing an automated update system in accordance with features and aspects hereof

FIG. 1 is a block diagram of an exemplary storage system 100 implementing an automated update system in accordance with features and aspects hereof. According to FIG. 1, the update system comprises a management system 102 coupled with one or more client systems 110. Management system 102 may be implemented, for example, as a hardware server implementing a service for updating and/or managing storage system devices and other components (e.g., a MegaRAID Storage Management (MSM) application provided by the LSI corporation). Management system 102 is operable to communicate, via network 104, with portal 106. Network 104 may be the Internet, or may be any suitable communication medium and protocol capable of coupling management system 102 with portal 106. Portal 106 comprises any entity capable of providing firmware updates for storage system devices. For example, portal 106 may comprise a website or interface hosted by a vendor of storage system devices that provides updates for the vendor's storage system devices. In one embodiment, management system 102 is communicatively coupled with multiple portals 106, wherein each portal provides updates for storage system devices manufactured by a specific vendor.

While in operation, management system 102 is capable of acquiring version information for various storage system devices 112 (e.g., storage controllers, host bus adapters, storage devices, etc.) that exist at client systems 110. By comparing the version information of each storage system device 112 with version information available at portal 106, management system 102 may determine whether relevant updates are available for each storage system device 112. Management system 102 may then download the relevant updates for use by client systems 110.

Client systems 110 comprise one or more storage devices 112, and may further comprise one or more compute servers implementing software or services for updating the firmware of storage devices 112 (e.g., client systems 110 may implement MSM applications for communicating with management system 102). Client systems 110 may be separate from or integrated with host systems (e.g., one or more host systems 120) that direct the operations of storage devices 112 during normal use (e.g., reading data, writing data, performing a backup, performing an integrity check, etc.).

Once client systems 110 have determined that management system 102 has acquired new updates, client systems 110 may acquire the updates and selectively apply them to storage system devices 112. As a part of the selective application process, a client system 110 may determine a volume of activity (e.g., queued host Input/Output (I/O) requests) at a given storage system device 112. If the volume is greater than a threshold value, the client system 110 may determine that the storage device is currently too busy and refrain from applying the update to the storage system device 112 until the number of queued host I/O requests has dropped below a predetermined threshold. In this manner, applying updates to the storage system has less of an impact on the performance of the storage system.

In a further embodiment, each client system 110 may be operable to determine whether an update to be applied to a storage system device 112 requires a reboot of the storage system device 112. If this is the case, then the client system 110 may proceed to query a user before applying the update. This in turn may help to ensure that performance of the storage system will not be unduly inhibited by the process of updating the firmware.

Figure 2:
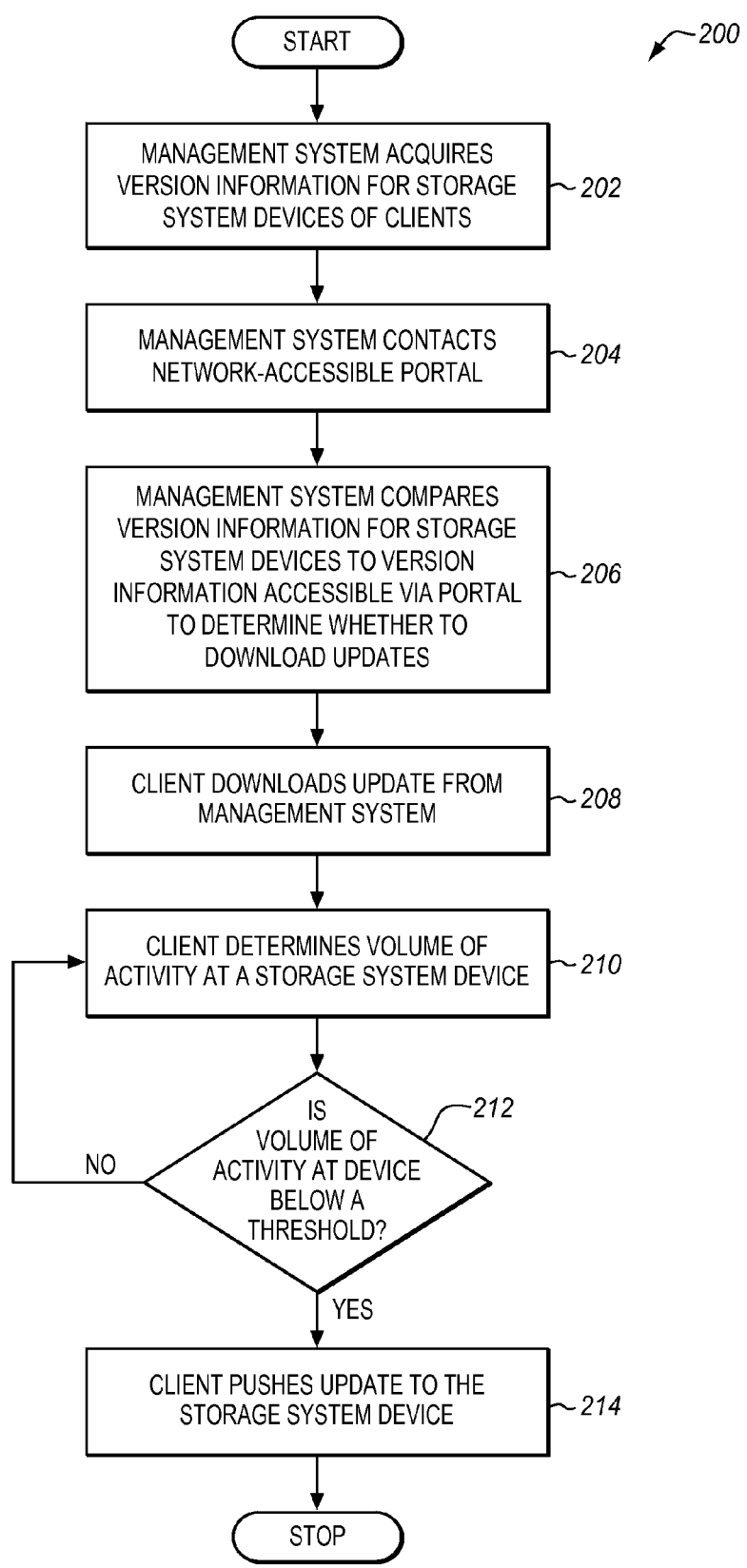
FIG. 2 is a flowchart describing an exemplary method in accordance with features and aspects hereof to automatically acquire updates and push them to storage system devices.

FIG. 2 is a flowchart describing an exemplary method 200 in accordance with features and aspects hereof to automatically acquire updates and push them to storage system devices. The method of FIG. 2 may be operable in a storage system such as described above with regard to FIG. 1.

Step 202 comprises acquiring, via a management system, version information for storage devices that are managed by a client system. The version information may include, for example, a model number for each storage system device as well as a current firmware version number implemented at the storage system device. The management system may acquire the information from each of the client systems (e.g., from a mapping structure at each client system that includes this information), and may further compile this information into a master list or other mapping structure for comparison with versioning information stored at a portal providing software updates.

Step 204 comprises contacting a network accessible portal via the management system. The portal may be contacted for example, via a network protocol such as FTP or TCP/IP. The network accessible portal provides firmware updates for the storage system devices.

Step 206 comprises the management system comparing version information for the storage devices to version information at the portal in order to determine whether to download firmware updates. For example, if a model of storage system device is utilizing an older version of firmware than one available at the portal, the management system may determine that it is appropriate to download the newer version. In further embodiments, the management system may be capable of determining potential compatibility issues with the updates available at the portal. For example, if a firmware update for a storage controller has a known compatibility issue with a model of storage device and this is indicated at the portal, the management system may refrain from downloading the update for storage controllers interacting with the conflicting model of storage device within the storage system.

Step 208 comprises a client system acquiring an update downloaded by the management system. The client systems may, for example, periodically query the management system or receive reports from the management system indicating whether new updates are available. In another embodiment, as soon as the management system determines that a new update should be applied to a device managed by a client system, it loads the update to a memory location on a component of the client system. The client system may then selectively apply the acquired updates to storage system devices.

Step 210 comprises the client system determining a volume of activity at a storage system device (e.g., activity at a storage controller, Host Bus Adapter (HBA), storage device, etc.). The volume may comprise an amount of queued host I/O commands, may be a percentage of the maximum number of commands that can be queued at the storage system device, or may be any suitable indicia of the volume of processing presently queued or active at a device.

In step 212, the client system determines if the volume of activity at the storage system device (e.g., an amount of queued host I/O commands) is below a threshold. The threshold may comprise, for example, a number of commands presently active or queued (e.g., 500-600), a percentage of the maximum number of commands that can be queued at the storage system device (e.g., 35%), an average number of commands queued at the storage system device over a period of time, and/or other suitable measures. Further, the threshold may vary depending on the model of the storage system device and/or the version of firmware currently implemented on the storage system device.

When the volume of activity drops below the threshold, in step 214 the client system proceeds to push the firmware update to the storage system device. Pushing an update may comprise providing instructions to the storage system device in order to reprogram internal registers of the device, and/or may comprise instructions to modify other non-volatile memory components of the storage system device.

Upon completion of the update, the storage system device implements the enhanced logic of the firmware update. Because the updates are applied based upon the volume of activity at storage system devices, the performance of the storage system in responding to host requests need not be significantly impeded by the update process.

FIG. 3 is a block diagram illustrating exemplary mapping structures for storage system devices maintained in a memory structure of client systems. According to FIG. 3, each client system comprises hardware circuitry implementing logic for querying storage system devices. Based upon these queries, the client system is capable of determining the number of devices that it manages, the model of each device, and the version number of the firmware implemented on each device. This information may then be stored at a mapping structure of each of the client systems. In this embodiment, client systems 302 and 304 each include four storage system devices. Client system 302 maintains a mapping structure 302-1 indicating the model number and firmware version of each of its devices. Similarly, client system 304 maintains a mapping structure 304-1 indicating the firmware version number of each of its own storage system devices.

FIG. 4 is a block diagram illustrating an exemplary mapping structure for storage system devices maintained in a memory of a management system in accordance with features and aspects hereof According to FIG. 4, management system 402 utilizes mapping structure 402-1. Mapping structure 402-1 includes information coalesced from mapping structures of each of client systems 302 and 304, and includes a tag, index, or other associative information indicating the client system for each storage system device. Further, mapping structure 402-1 includes information describing the available updates for given storage system devices (e.g., updates that are available for downloading via a portal, or updates that have already been downloaded from a portal and have yet to be applied). This information may include details describing, for example, whether a reboot of the storage system device will be required to implement the update, whether the update is mission-critical (i.e., relates to a primary function of the storage system device or fixes a critical flaw), etc. Client systems that acquire updates from the management system may use this and other information from mapping structure 402-1 in order to determine whether (as well as when) to apply the update to coupled storage system devices. Furthermore, information may include threshold limits that define the threshold for applying an update.

Figure 5:
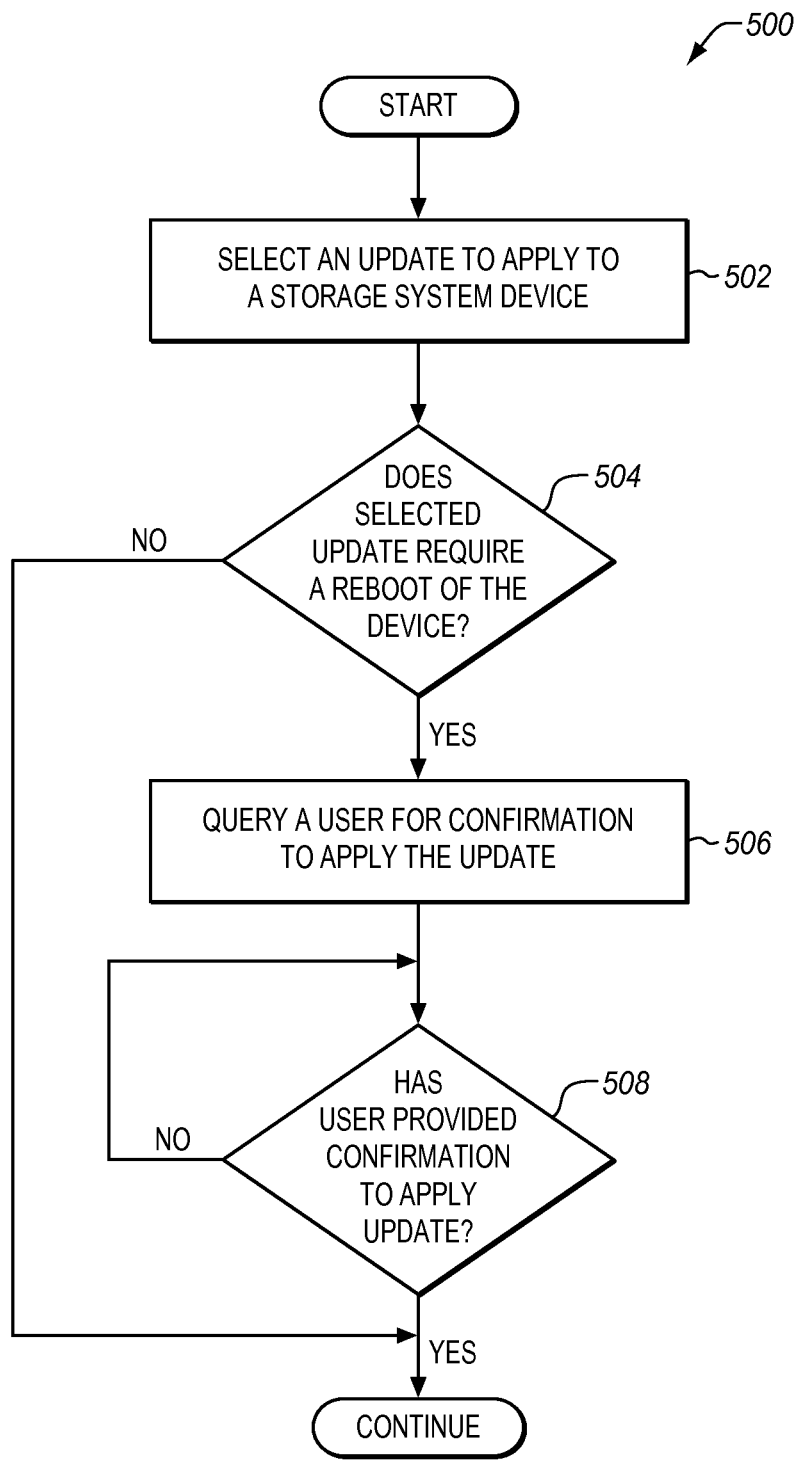
FIG. 5 is a flowchart describing an exemplary method in accordance with features and aspects hereof to determine whether to apply an update to a storage system device.

FIG. 5 is a flowchart describing an exemplary method 500 in accordance with features and aspects hereof to determine whether to apply an update to a storage system component. Specifically, FIG. 5 may be implemented at a client system described above, and may be implemented, for example after step 208 of method 200 of FIG. 2.

According to FIG. 5, step 502 includes selecting an update to apply to a storage system device. This may comprise simply acquiring an update from a management system that reflects a more recent version of firmware than is currently implemented at a given storage system device. However, in environments where available processing resources are scarce, the step may include prioritizing which update(s) to apply based upon a number of factors. For example, factors for determining the order in which to apply updates may include the function performed by the storage system device (e.g., a storage controller vs. a storage device), whether the update is indicated as mission-critical, the relative current load of each storage system device, etc.

Step 504 comprises determining whether the selected update requires a reboot of the device. For example, this information may be included with the update itself, or may be kept on a mapping structure stored in memory for the management system and/or the client system. A reboot may cause a substantially longer period of downtime for the storage system device than would normally be encountered during a firmware update.

If no reboot is required, processing may continue, for example, to step 210 of method 200 of FIG. 2. Alternatively, if a reboot of the storage system device is required, then the client system may query a user (e.g., a system engineer) in step 506 to determine whether it is appropriate to apply the update. The client system may then refrain from applying the update until it determines that a confirmation has been received by the user in step 508. If immediate application of the update is not desired by the user, the user may include scheduling information in the confirmation indicating the time/date that the update should be applied by the client system. Alternatively, the user may reject the update and the method may halt (not shown).

Figure 6:
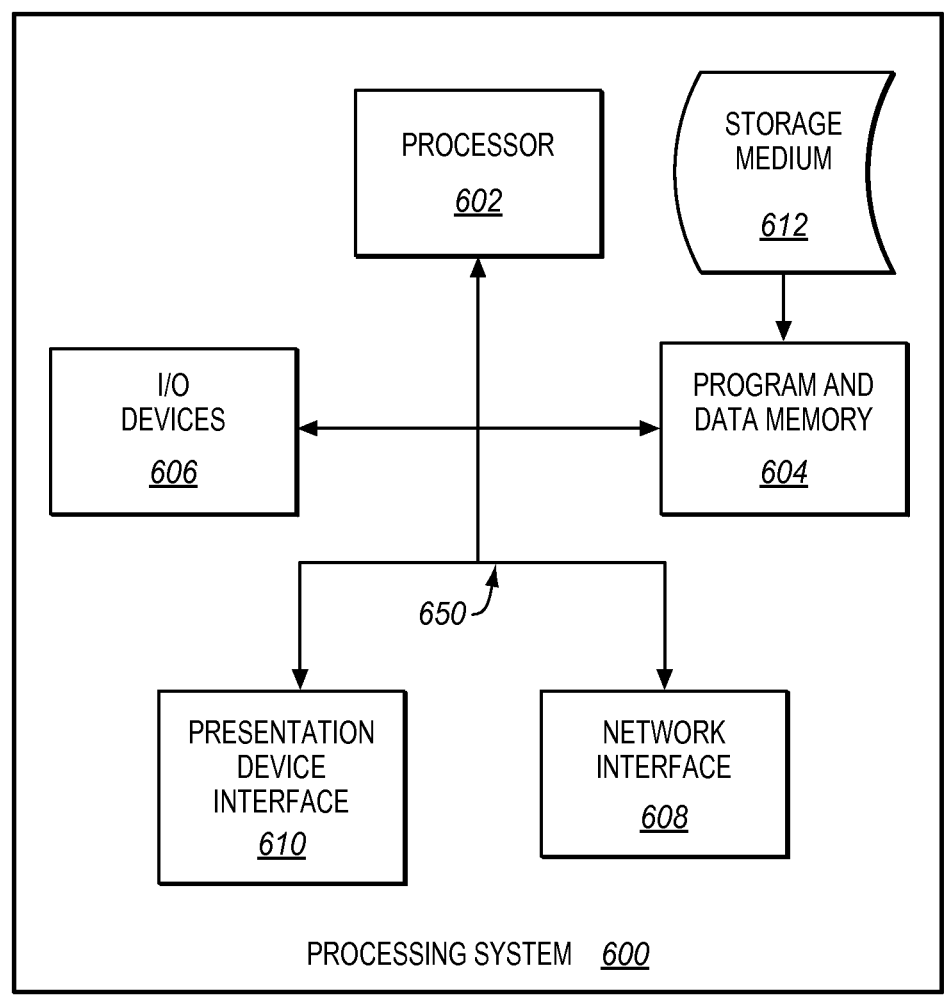
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof In one particular embodiment, software is used to direct a processing system to perform the various operations disclosed herein. FIG. 6 illustrates a processing system 600 operable to execute a computer readable medium embodying programmed instructions to perform desired functions in an exemplary embodiment. For example, processing system 600 may implement a client system and/or a management system. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be integrated with the system to interface to one or more presentation devices, such as printing systems and displays for presentation of presentation data generated by processor 602.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached Small Computer System Interface (SAS) storage system implemented by at least one processor and memory, the storage system comprising:
a management system operable to contact an Internet Protocol (IP) portal providing updates for firmware residing on storage system devices; and
a client system coupled for communication with the management system, the client system comprising one or more storage system devices,
the management system further operable to acquire version information for the storage system devices of the client system, and further operable to selectively download updates for the storage system devices from the portal, based on comparisons between version information for the storage system devices and version information for updates accessible via the portal,
the client system further operable to download an update from the management system, further operable to determine a current volume of activity at a storage system device that is handling Input/Output commands for a host, and further operable to push the update to the storage system device via SAS communications if the current volume of activity is below a threshold.

2. The storage system of claim 1, wherein
the storage system devices comprise at least one of a storage controller, a host bus adapter, a disk drive, a solid state drive, a switch, a router, a port multiplier, and a port multiplexer.

3. The storage system of claim 2, wherein
the threshold comprises a number of queued host Input/Output (I/O) requests at a storage controller of the client system.

4. The storage system of claim 2, wherein
the threshold comprises a percentage of the maximum number of requests that can be queued at a storage controller of the client system.

5. The storage system of claim 2, wherein
the threshold for each storage controller of the client system is determined based upon a model number and a version number of the storage controller.

6. The storage system of claim 1, wherein
the client system is further operable to maintain a mapping structure indicating the version information for each of the storage system devices, and
the management system is further operable to acquire the version information for each of the storage system devices by reviewing the mapping structure of the client system.

7. The storage system of claim 6, wherein
the management system is further operable to coalesce the mapping structures of multiple client systems to generate a master mapping structure, further operable to compare version information in the master mapping structure to version information for updates accessible via the portal, and further operable to download an update from the portal if an entry in the master mapping structure indicates that a storage system device utilizes an older version of firmware than an update listed at the portal.

8. The storage system of claim 1, wherein
each client system is further operable to determine whether a reboot of a storage system device is required to apply the selected update, further operable to notify a user of the required reboot, and further operable to refrain from applying the selected update to the coupled storage system device until after a confirmation has been provided by the user.

9. A method for utilizing a Serial Attached Small Computer System Interface (SAS) storage system that comprises a management system coupled with a client system to provide firmware updates to storage system devices of the client system, the method comprising:
contacting, via a management system, an Internet Protocol (IP) portal providing updates for firmware residing on storage system devices;
acquiring, via the management system, version information for storage system devices residing on a client system that is coupled with the management system;
selectively downloading, via the management system, updates for the storage system devices from the portal, based on comparisons between version information for the storage system devices and version information for updates accessible via the portal;
downloading, via the client system, an update from the management system;
determining, at the client system, a current volume of activity at a storage system device that is handling Input/Output commands for a host; and
pushing, via the client system, the update to the storage system device via SAS communications if the current volume of activity is below a threshold.

10. The method of claim 9, wherein
the storage system devices comprise at least one of a storage controller, a host bus adapter, a disk drive, a solid state drive, a switch, a router, a port multiplier, and a port multiplexer.

11. The method of claim 10, wherein
the threshold comprises a number of queued host Input/Output (I/O) requests at a storage controller of the client system.

12. The method of claim 10, wherein
the threshold comprises a percentage of the maximum number of requests that can be queued at a storage controller of the client system.

13. The method of claim 10, wherein
the threshold for each storage controller of the client system is determined based upon a model number and a version number of the storage controller.

14. The method of claim 9, further comprising
maintaining, at the client system, a mapping structure indicating the version information for each of the storage system devices; and
acquiring the version information, via the management system, by analyzing the mapping structure of the client system.

15. The method of claim 14, further comprising
coalescing, at the management system, the mapping structures of multiple client systems to generate a master mapping structure;
comparing, via the management system, version information in the master mapping structure to version information for updates at the portal; and
downloading, at the management system, an update from the portal if an entry in the master mapping structure indicates that a storage system device utilizes an older version of firmware than an update listed at the portal.

16. The method of claim 9, further comprising
- determining, at the client system, whether a reboot of a storage system device is required to apply the selected update;
- notifying, via the client system, a user of the required reboot; and
- refraining, at the client system, from applying the selected update to the coupled storage system device until after a confirmation has been provided by the user.

17. A non-transitory computer readable medium embodying programmed instructions which, when executed by a processor, are operable for performing a method for utilizing a Serial Attached Small Computer System Interface (SAS) storage system comprising a management system coupled with a client system to provide firmware updates to storage system devices of the client system, the method comprising:
- contacting, via a management system, an Internet Protocol (IP) portal providing updates for firmware residing on storage system devices;
- acquiring, via the management system, version information for storage system devices residing on a client system that is coupled with the management system;
- selectively downloading, via the management system, updates for the storage system devices from the portal, based on comparisons between version information for the storage system devices and version information for updates accessible via the portal;
- downloading, via the client system, an update from the management system;
- determining, at the client system, a current volume of activity at a storage system device that is handling Input/Output commands for a host; and
- pushing, via the client system, the update to the storage system device via SAS communications if the current volume of activity is below a threshold.

18. The medium of claim 17, wherein
the storage system devices comprise at least one of a storage controller, a host bus adapter, a disk drive, a solid state drive, a switch, a router, a port multiplier, and a port multiplexer.

19. The medium of claim 17, wherein
the threshold comprises a number of queued host Input/Output (I/O) requests at a storage controller of the client system.

20. The medium of claim 17, wherein the method further comprises
- determining, at the client system, whether a reboot of a storage system device is required to apply the selected update;
- notifying, via the client system, a user of the required reboot; and
- refraining, at the client system, from applying the selected update to the coupled storage system device until after a confirmation has been provided by the user.

* * * * *